United States Patent Office 3,847,826
Patented Nov. 12, 1974

3,847,826
ANTIFRICTION COMPOSITION
Pavel Mikhailovich Ivanov, ulitsa Komsomola 5/7, kv. 7, Leningrad, U.S.S.R.
No Drawing. Filed Nov. 2, 1973, Ser. No. 412,436
Int. Cl. C10m 7/06, 7/28
U.S. Cl. 252—12         2 Claims

ABSTRACT OF THE DISCLOSURE

An antifriction composition comprising polytetrafluoroethylene and copper sulphide wherein the copper sulphide is present from a small effective amount up to 52% by weight of polytetrafluorethylene.

---

The present invention relates to antifriction compositions, and more particularly to antifriction compositions on the basis of polytetrafluoroethylene.

These compositions find a wide application in various fields of industry, and especially in mechanical and instrumentation engineering.

It is known to use polytetrafluoroethylene (fluoroplastic, PTFE), as well as modifications thereof separately or in combinations with resins either non-filled or filled with various additives (graphite, molybdenum disulphide, French chalk, metallic powders, boron nitride, plant fibers, glass fiber and other fillers).

However, the above-mentioned materials, when operating under heavy loads, at high sliding speeds and elevated temperatures have lower operativeness since due to a considerable temperature increase on the friction surface polytetrafluoroethylene is destroyed at some points, begins to decompose, and may adhere to the surface of a cooperating piece so as to envelope it, whereby the disastrous wear and welding of the pieces in frictional engagement therebetween take place.

It is an object of the present invention to provide an antifriction composition which is operative under heavy loads, and at elevated temperatures and sliding speeds.

In accordance with this and other objects, the invention consists in the provision of an antifriction composition on the basis of polytetrafluoroethylene. According to the invention the composition comprises copper sulphide used in an amount of up to 52% by weight of the polytetrafluoroethylene.

Copper sulphide performs a triple function in the antifriction composition on the basis of polytetrafluoroethylene:

1. As a filler it improves the mechanical strength of PTFE and its wear resistance;
2. Penetrating between the surfaces of the PTFE and a cooperating piece in frictional engagement it brings about the reduction of the contact area of the PTFE during short time intervals, whereby the PTFE is prevented from enveloping the surface of the cooperating piece;
3. Under heavy operating conditions of the PTFE in a friction assembly, where the PTFE is destroyed at some points of the friction surface with the formation of decomposition products of the PTFE, copper sulphide reacts with the PTFE to form copper fluoride which will lubricate the friction surfaces so as to reduce friction forces and to prevent further decomposition of the PTFE, and hence its sticking to the cooperating piece.

The antifriction compositions according to the invention comprising copper sulphide are capable of operating under more severe conditions than similar compositions which do not contain copper sulphide. They enlarge the field of application of PTFE and permit more completely utilizing the most valuable properties of PTFE, such as low coefficient of friction, high chemical resistance, corrosion resistance, high softening point as compared to other thermosetting resins. Copper sulphide can be introduced into all compositions in which PTFE is used as the sliding component: pure PTFE, filled PTFE, plastic suspensions, lacquers and enamels containing PTFE, antifriction compositions on the basis of PTFE and the like.

Availability and low cost of copper sulphide, simple method of its introduction into compositions containing PTFE make the use thereof economically advantageous.

The method of introduction of copper sulphide into antifriction compositions on the basis of PTFE or into PTFE is similar to that used for introduction of other fillers (graphite, molybdenum disulphide and the like) into the above-mentioned compositions and is widely known. No special equipment and devices are required for the introduction of copper sulphide. Copper sulphide may be introduced either in the form of dry finely divided powder under careful stirring, or in the form of a suspension separately or in combination with other fillers.

Better understanding of the invention may be had from the following examples of the antifriction compositions comprising PTFE with the addition of copper sulphide.

EXAMPLE 1

|  | Wt. percent |
|---|---|
| Polytetrafluoroethylene | 66 |
| Copper sulphide | 34 |

In this composition copper sulphide functions not only as antiscratch additive, but is also the filler which improves the hardness of the composition, its load-bearing capacity and temperature range, as well as some other physical parameters.

EXAMPLE 2

|  | Wt. percent |
|---|---|
| 1. Cotton fiber | 44 |
| 2. Polytetrafluoroethylene | 40 |
| 3. Phenol-formaldehyde resin and the polyvinylbutyral resin in the ratio 1:2 | 15.9 |
| 4. Copper sulphide | 0.1 |

EXAMPLE 3

|  | Wt. percent |
|---|---|
| 1. Asbestos fiber | 34 |
| 2. Polytetrafluoroethylene | 31 |
| 3. Phenol-formaldehyde resin and polyvinylbutyral resin in the ratio 1:2 | 20 |
| 4. Molybdenum disulphide | 9 |
| 5. Copper sulphide | 6 |

EXAMPLE 4

|  | Wt. percent |
|---|---|
| 1. Cotton fabric | 49.3 |
| 2. Polytetrafluoroethylene | 34.6 |
| 3. Phenol-formaldehyde resin | 4.3 |
| 4. Polyvinylbutyral resin | 8.6 |
| 5. Copper sulphide | 3.2 |

The number of examples of antifriction compositions comprising PTFE and copper sulphide may be considerably extended by those skilled in the art without departure from the spirit and scope of the invention. It should be noted that the addition of copper sulphide is desirable in all antifriction compositions on the basis of PTFE which are intended for operation under heavy conditions.

What is claimed is:

1. An antifriction composition comprising polytetrafluoroethylene and copper sulphide wherein the copper sulphide is present from a small effective amount up to 52% by weight of the polytetrafluoroethylene.

2. The composition of Claim 1 which additionally contains effective amounts of materials selected from the group consisting of cotton fibers, cotton fabric, asbestos, phenol-formaldehyde resins, polyvinylbutyral resins and molybdenum disulphide.

References Cited

UNITED STATES PATENTS

| | | | |
|---|---|---|---|
| Re. 26,088 | 9/1966 | Rulon-Miller et al. | 252—12 |
| 2,400,091 | 5/1946 | Alfthan | 252—12 |
| 2,400,099 | 5/1946 | Brubaker et al. | 252—12 |
| 2,977,302 | 3/1961 | Spengler et al. | 252—25 |
| 3,125,520 | 3/1964 | Myers | 252—25 |
| 3,127,346 | 3/1964 | Oliver et al. | 252—25 |
| 3,297,572 | 1/1967 | Haltner et al. | 252—25 |
| 3,313,728 | 4/1967 | Glasson et al. | 252—25 |
| 3,313,729 | 4/1967 | Glasson | 252—25 |
| 3,453,208 | 7/1969 | Gallagher et al. | 252—12.4 |

DANIEL E. WYMAN, Primary Examiner

I. VAUGHN, Assistant Examiner

U.S. Cl. X.R.

252—25, 389